No. 680,436. Patented Aug. 13, 1901.
E. P. NICHOLS.
SHOULDER BLADE EXTRACTOR.
(Application filed Feb. 7, 1901.)
(No Model.)
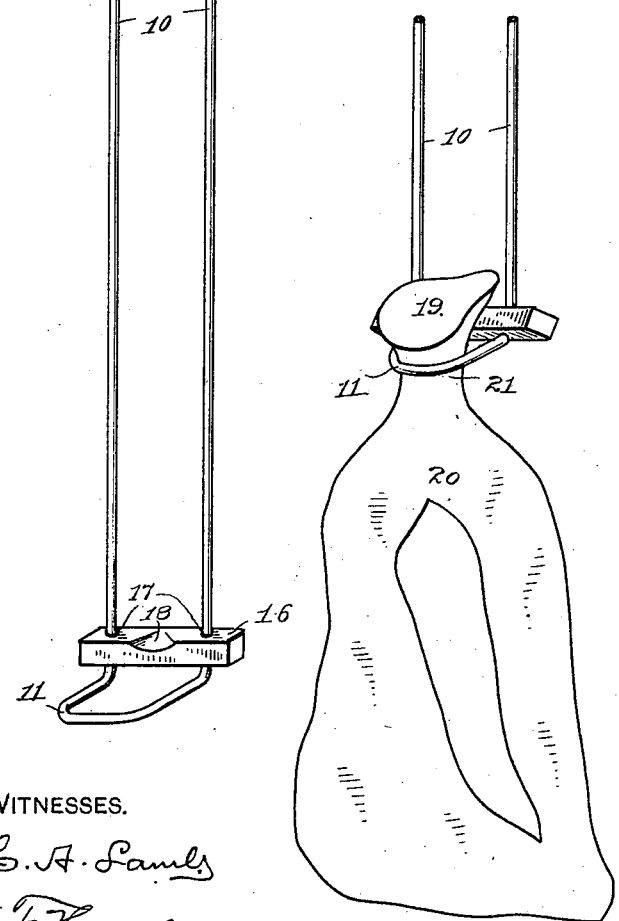

UNITED STATES PATENT OFFICE.

ELMER P. NICHOLS, OF STAMFORD, CONNECTICUT.

SHOULDER-BLADE EXTRACTOR.

SPECIFICATION forming part of Letters Patent No. 680,436, dated August 13, 1901.

Application filed February 7, 1901. Serial No. 46,348. (No model.)

*To all whom it may concern:*

Be it known that I, ELMER P. NICHOLS, a citizen of the United States, residing at Stamford, county of Fairfield, State of Connecticut, have invented a new and useful Shoulder-Blade Extractor, of which the following is a specification.

My invention has for its object to provide a simple and inexpensive device adapted for general use in markets, stores, hotels, or wherever it may be required to remove the shoulder-blades from fore quarters of veal and lamb.

So far as I am aware there has heretofore been no mechanical device for abstracting shoulder-blades, the ordinary practice being to cut around the blade and dig it out with a knife or to pull it out by main strength, sometimes with the assistance of a cord.

In order to avoid the serious difficulty and inconvenience heretofore experienced in markets, stores, hotels, and wherever it may have been required to remove the shoulder-blades from fore quarters of veal and lamb and to provide a simple and inexpensive device for accomplishing the desired result that may be easily and quickly operated by any person not necessarily skilled in the use of machinery and tools, I have devised the novel shoulder-blade extractor which I will now describe, referring to the accompanying drawings, forming part of this specification, and using reference characters to designate the several parts.

Figure 1 is a perspective showing the device in its normal position as when not in use; Fig. 2, a similar view showing the sliding cross-bar raised as when it is desired to insert the knob of a shoulder-blade between the side rods, and Fig. 3 is a similar view illustrating the operation of my novel blade-extractor in removing a shoulder-blade.

10 denotes side rods, which may be made of any suitable material, as steel wire. These side rods are preferably made from a single piece of wire bent at its mid-length, so that the side rods lie substantially parallel, the mid-length of the piece of wire forming in the completed device a loop 11, which is bent to substantially a right angle to the side rods, as is clearly shown in Figs. 1 and 2, and is adapted to engage the knob of a shoulder-blade, as is clearly shown in Fig. 3. The ends of the side rods opposite to the loop are in practice connected together in any suitable manner. I have shown both side rods as riveted to a bar 12 and said bar as swiveled upon the shank 13 of an eye 14, which is adapted to engage a stationary hook 15 or any rigid support in use, as will be more fully explained.

16 denotes a sliding cross-bar having holes 17, through which the side rods pass freely. I preferably provide the upper outer edge of the sliding cross-bar with a recess 18, which is adapted to receive a portion of the knob 19 of a shoulder-blade, which I have indicated by 20.

In use the fore quarter of veal or lamb from which it is desired to remove the shoulder-blade may be left lying upon a bench or block. The operator moves sliding cross-bar 16 up more or less on the side rods, as indicated in Fig. 2, and passes the side rods over the knob of the shoulder-blade, the side rods springing, if necessary, sufficiently to allow the knob of the shoulder-blade to pass between them. The extractor is then drawn up until the neck 21 of the shoulder-blade lies in loop 11, and the sliding cross-bar is moved downward on the side rods until it engages the neck of the shoulder-blade, as clearly shown in Fig. 3, a portion of the knob of the shoulder-blade preferably lying in recess 18, as shown, so as to lock the extractor to the shoulder-blade and prevent the knob from shifting in the loop. Having locked the neck of the shoulder-blade in the loop by means of the cross-bar, the device, with the fore quarter of veal or lamb suspended therefrom, may be affixed to a hook or other rigid object by means of the eye 14. The operator then presses down upon the quarter of veal or lamb and pushes it off from the shoulder-blade, leaving the latter in the loop, as in Fig. 3.

It will be noted that in use there will be no twisting of the side rods, owing to the fact that the side rods, loop, and cross-pieces all turn together on the shank of the eye.

Having thus described my invention, I claim—

1. A shoulder-blade extractor consisting essentially of side rods bent to form a loop adapted to engage the knob of a shoulder-blade and a sliding cross-bar adapted to lock the knob of a shoulder-blade in the loop.

2. A shoulder-blade extractor comprising side rods bent to form a loop, for the purpose set forth, a cross-bar adapted to slide on said rods and to coöperate with the loop and means, as an eye, whereby the extractor is suspended in use.

3. A shoulder-blade extractor comprising side rods bent to form a loop, a cross-bar 16 adapted to slide on the side rods and to coöperate with the loop, a bar 12 by which the upper ends of the side rods are connected and an eye having a shank swiveled in bar 12 substantially as described.

4. A shoulder-blade extractor comprising side rods bent to form a loop, and a cross-bar adapted to slide on the side rods and provided with a recess 18, substantially as shown, for the purpose specified.

In testimony whereof I affix my signature in presence of two witnesses.

ELMER P. NICHOLS.

Witnesses:
GEO. S. WILSON,
F. B. GURLEY.